United States Patent [19]

Nakamura et al.

[11] Patent Number: 4,715,464
[45] Date of Patent: Dec. 29, 1987

[54] POWER STEERING SYSTEM WITH HYDRAULIC REACTION

[75] Inventors: Keiichi Nakamura, Kariya; Mikio Suzuki, Hekinan, both of Japan

[73] Assignee: Toyoda Koki Kabushiki Kaisha, Kariya, Japan

[21] Appl. No.: 944,507

[22] Filed: Dec. 22, 1986

[30] Foreign Application Priority Data

Dec. 27, 1985 [JP] Japan ................ 60-292792

[51] Int. Cl.⁴ .................................. B62D 5/08
[52] U.S. Cl. .................. 180/142; 180/143; 180/148
[58] Field of Search .......... 180/142, 141, 143, 148; 91/434, 458; 417/293

[56] References Cited

U.S. PATENT DOCUMENTS

| | | | |
|---|---|---|---|
| 3,744,515 | 7/1973 | Inoue | 180/142 |
| 4,471,811 | 9/1984 | Kawabata et al. | 180/142 |
| 4,593,783 | 6/1986 | Honaga et al. | 180/142 |
| 4,605,085 | 8/1986 | Honaga et al. | 180/142 |
| 4,609,331 | 9/1986 | Doffy | 180/142 |
| 4,616,728 | 10/1986 | Suzuki et al. | 180/142 |
| 4,637,484 | 1/1987 | Ijiri et al. | 180/142 |

FOREIGN PATENT DOCUMENTS 59-75366   5/1984   Japan.
61-44078   3/1986   Japan.

*Primary Examiner*—John J. Love
*Assistant Examiner*—Donn McGiehan
*Attorney, Agent, or Firm*—Oblon, Fisher, Spivak, McClelland & Maier

[57] ABSTRACT

A power steering system which includes a fluid source that supplies pressure fluid of a constant flow rate, a fluid motor for supplementing manual steering torque, a servo-valve for distributing fluid to the fluid motor, and a reaction device for applying hydraulic reaction or feeling to a starting wheel in accordance with fluid pressure applied thereto. A magnetic control valve having a solenoid therein is connected to the reaction device to vary fluid pressure applied thereto in a predetermined range of pressures in accordance with vehicle operating condition. A mechanism for controlling the fluid pressure applied to reaction device at a predetermined pressure in the predetermined range of pressure even when the current supplied to the solenoid becomes abnormal is incorporated in the magnetic control valve.

15 Claims, 19 Drawing Figures

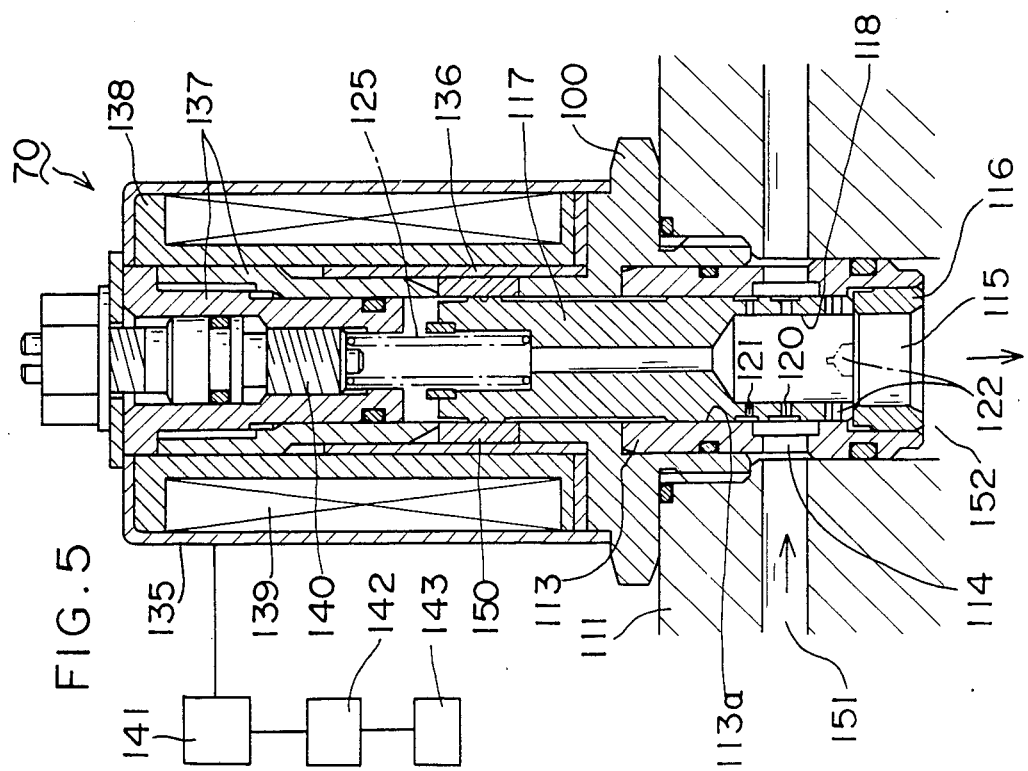

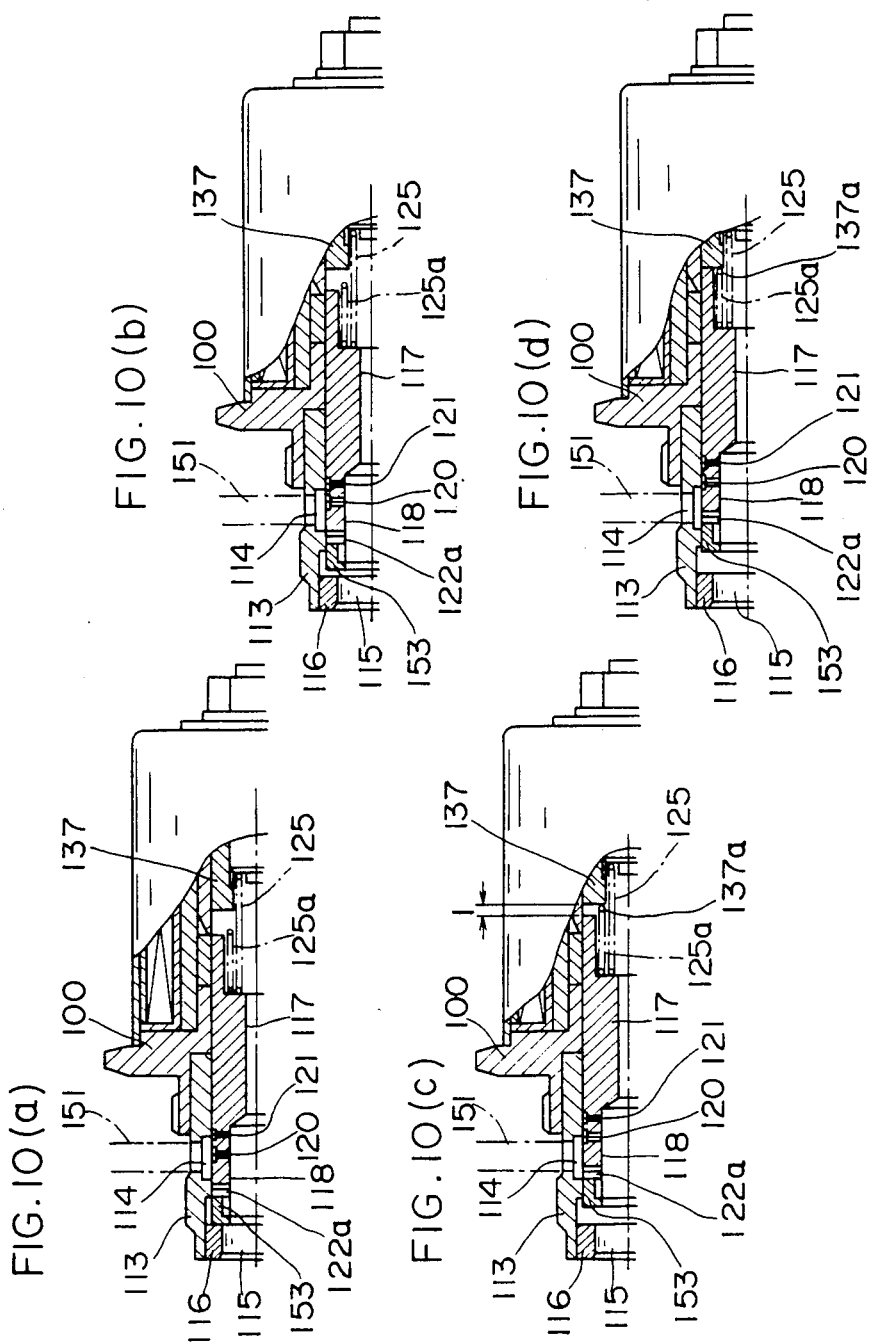

POWER STEERING SYSTEM WITH HYDRAULIC REACTION

BACKGROUND OF THE INVENTION

1. Field of the Invention

The present invention relates to a power steering system wherein power assistance derived therefrom will be modulated according to a vehicle operating condition such as, for example, vehicle speed.

2. Discussion of Background

In maneuvering a steering wheel of an automotive vehicle, it is recognized that power assistance at high vehicle speeds may desirably be less than at low speeds to allow for stabilization of the steering wheel at high speeds.

A power steering system with the above-mentioned steering characteristics is known and includes a reaction device which in accordance with fluid pressure supplied thereto provides resistance against relative rotation between valve elements of a servo-valve. The servo-valve controls fluid flow to and from a fluid motor according to the relative rotation between the valve elements, which, in turn, generates the power assistance. The fluid pressure supplied to the reaction device is controlled by a magnetic control valve at a low level when high power assistance is necessary at low vehicle speeds, and on the contrary, at a high level when less power assistance is required at high vehicle speeds.

Conventionally, the magnetic control valve includes a valve body which has a bore, an inlet port connected to the reaction device and is also supplied with fluid flow of a constant rate, and an outlet port connected to a reservoir. A spool valve is slidably mounted in the bore so as to vary the area of a variable orifice which is disposed between the inlet and outlet ports. A spring is provided which urges the spool valve in a direction to decrease the orifice area. A solenoid is mounted on the valve body and moves the spool by excitation thereof against the spring to increase the orifice area at low vehicle speeds or when the vehicle is stopped.

However, in the event where electric current supplied to the solenoid becomes null due to, for instance, problems occurring in the current supply circuit, the spool valve is urged to a position where the orifice area is a minimum. Accordingly, the fluid pressure supplied to the reaction device is always maintained at a maximum so as to result in a lack of power assistance at low vehicle speeds or when the vehicle is stopped.

Moreover, if excess electric current is continuously supplied to the solenoid because of problems in operation of a controller, the spool valve is overshifted to a position where the variable orifice opens wide. Accordingly, the fluid pressure supplied to the reaction device is kept low, resulting in excess power assistance and loss stabilization of the steering wheel at high vehicle speeds.

SUMMARY OF THE INVENTION

It is therefore an object of the present invention to provide a power steering system with hydraulic reaction, wherein the fluid pressure applied to a reaction device is maintained at an predetermined level, even when the amount of electric current supplied to a magnetic control valve which controls the fluid pressure applied to the reaction device becomes abnormal.

Another object of the present invention is to provide a power steering system with hydraulic reaction, wherein a magnetic control valve, which controls the fluid pressure applied to a reaction device in a predetermined range of pressures acording to vehicle operating conditions, is provided with means for maintaining the fluid pressure at an approximately middle pressure of the pressure range, when the excitation of a solenoid of the magnetic control valve is discontinued when the current is cutoff or becomes null.

Briefly, according to the present invention, these and other objects are achieved by providing a power steering system with hydraulic reaction including fluid source means for supplying pressure fluid of a constant flow rate, a fluid motor, a servo-valve for distributing pressure fluid to said fluid motor in accordance with relative rotation between input and output shafts, reaction means for providing resistance against relative rotation between input and output shaft, a magnetic control valve provided with a solenoid therein, connected to the reaction means so as to vary fluid pressure applied thereto in a predetermined range of pressures in accordance with vehicle operating conditions, and means incorporated in the magnetic control valve for controlling the fluid pressure at a predetermined pressure in the predetermined pressure range when the current supplied to the solenoid is abnormal.

BRIEF DESCRIPTION OF THE DRAWINGS

Various other objects, features and attendant advantages of the present invention will be more fully appreciated as the same becomes better understood from the following detailed description when considered in connection with the accompanying drawings in which like reference characters designate like or corresponding parts throughout the several views and wherein:

FIG. 5 is a longitudinal sectional view of the magnetic control valve shown in FIG. 4;

FIGS. 6(*a*), 6(*b*) and 6(*c*) are fragmentary sectional views of the magnetic control valve showing the operation thereof;

FIGS. 10(*a*), 10(*b*), 10(*c*) and 10(*d*) are fragmentary sectional views of the magnetic control valve shown in FIG. 9 showing the operation thereof;

DESCRIPTION OF THE PREFERRED EMBODIMENTS

Figure 1:
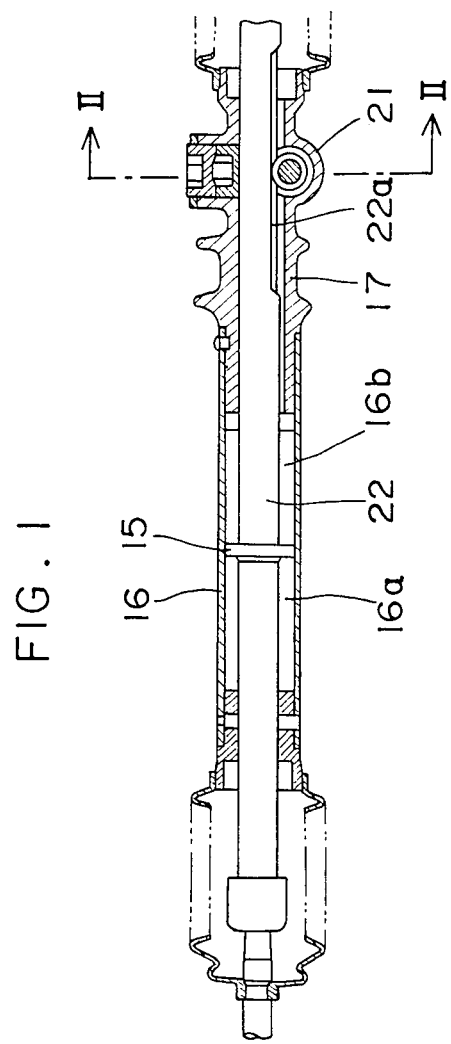
FIG. 1 is a longitudinal section view of a power steering system according to the present invention.

Referring to the drawings and to FIG. 1 in particular, reference numeral 17 designates a gear housing that is fixedly mounted on a chassis of an automotive vehicle. A steering rod 22 is slidably mounted on gear housing 17, with opposite ends thereof extending outwardly from gear housing 17. Respective ends of steering rod 22 are connected to steerable wheels of the vehicle by way of a conventional steering link mechanism. A piston 15 of a fluid motor is fixedly attached to a middle portion of steering rod 22 and is slidably accommodated in a cylinder tube 16 that is unitarily connected to gear housing 17.

Figure 2:
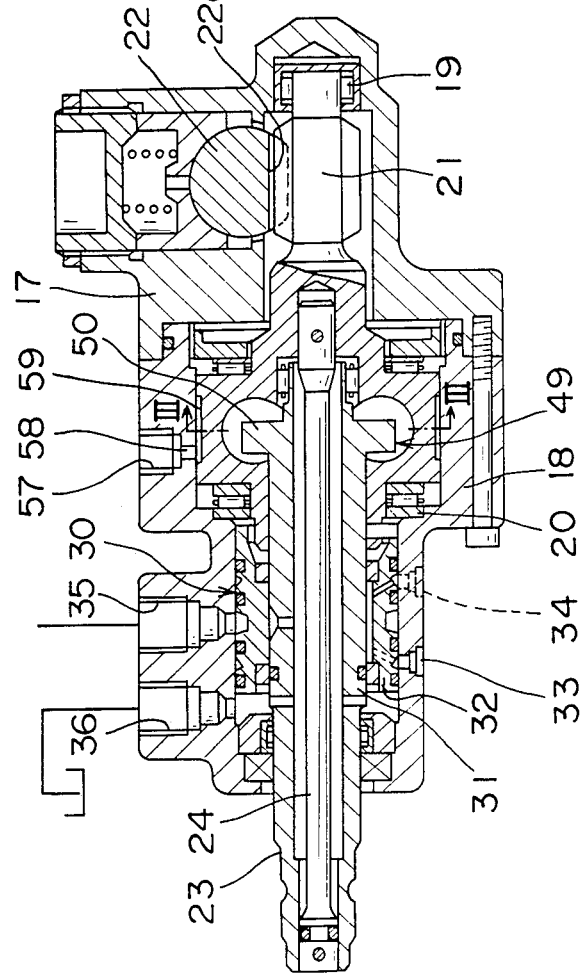
FIG. 2 is an enlarged sectional view taken along line II—II of FIG. 1.

Referring now to FIG. 2, valve housing 18 is fixedly attached to gear housing 17. An output shaft 21 is rotatably journaled to gear housing 17 and valve housing 18 by means of a pair of bearings 19, 20 in perpendicular relation with steering rod 22. A pinion is provided on output shaft 21 and is engaged with a rack 22a which is formed on steering rod 22.

Valve housing 18 accommodates servo-valve 30 which comprises a sleeve valve member 32 and a rotary vlave member 31. Sleeve valve member 32 is rotatably housed in valve housing 18 in coaxial relation with output shaft 21. Rotary valve member 32 is formed on an input shaft 23 which is connected to a steering wheel. Input shaft 23 is flexibly connected to output shaft 21 by means of a torsion bar 24. A plurality of axially extending slots (not shown) are formed on an internal surface of sleeve valve member 32 and on a circumferential surface of rotary valve member 31 at regular intervals. Thus, according to the relative rotation between sleeve valve member 32 and rotary valve member 31, a supply port 35 communicates with one of cylinder ports 33, 34 which are respectively in fluid communication with left and right chambers 16a, 6b of the fluid motor, and an exhaust port 36 communicates with the remaining port of cylinder ports 33, 34. Sleeve valve member 32 is connected to the inner end of output shaft 21 with a spline engagement.

Figure 3:
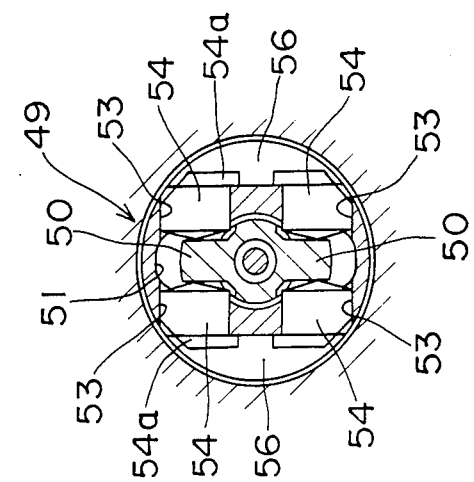
FIG. 3 is a cross-sectional view taken along line III-—III of FIG. 2.

FIGS. 2 and 3 show in detail the construction of a reaction device 49. The interior end of input shaft 23 is provided with a pair of radial projections 50 which are received with a predetermined clearance within respective recesses 51 formed in a large diameter portion of output shaft 21, so as to allow relative rotation between input and output shafts 23, 21 by an angle of several degress.

Two pairs of bores 53 are formed in the large diameter portion of output shaft 21, facing respective sides of corresponding radial projections 50. Plungers 54 are slidably received in respective bores 53 and are urged toward radial projections 50 by means of fluid pressure supplied to reaction chambers 56 which are formed in output shaft 21 and which accommodate the rear portion of plungers 54 therein. Forward movement of plungers 54 is limited by abutment of flanges 54a formed on plungers 54 at rear ends thereof with bottom surfaces of reaction chambers 56 so as to hold projections 50 at a central position. Fluid pressure controlled in accordance with vehicle operating conditions such as vehicle speed is supplied to reaction chambers 56 by way of a port 57, a conduit 58 and an annular recess 59 formed on a periphery of the large diameter portion of output shaft 21.

Figure 4:
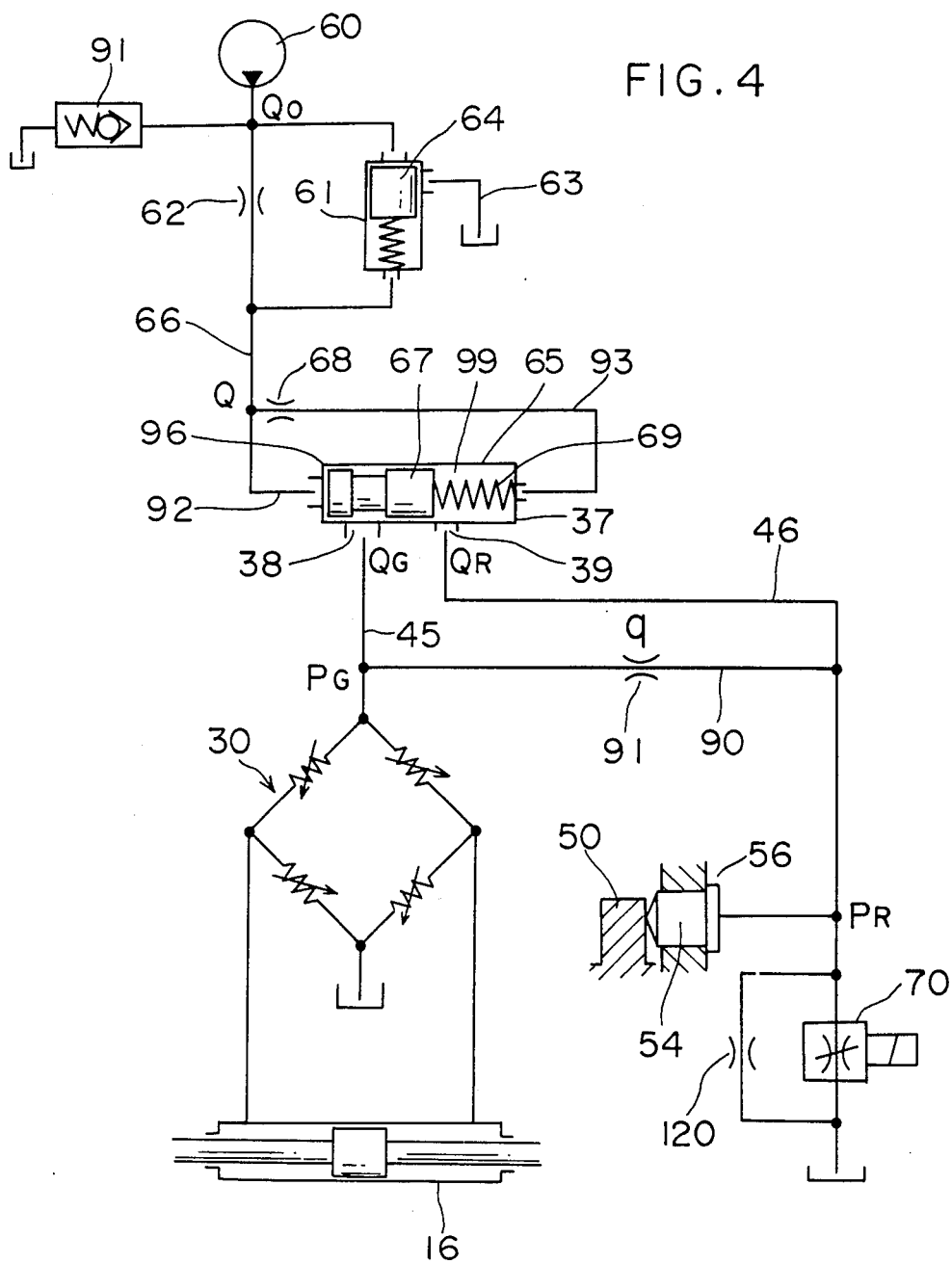
FIG. 4 is a diagrammatic view of the power steering system according to the present invention.

As shown in FIG. 4, reference numeral 60 designates a pump that is driven by an engine of the vehicle. An outlet port of pump 60 is connected to a flow control valve 61 which comprises a metering orifice 62 and a bypass spool valve 64 that is moved in accordance with the pressure differential across metering orifice 62 so as to keep the pressure differential contstant. Thus, pressure fluid QO discharged from pump 60 is divided into pressure fluid Q of a constant flow rate flowing through metering orifice 62 and any existing excess flow led to a passage 63 according to the function of flow control valve 61. A conventional pressure relief valve 91 is connected to the outlet port of pump 60 to relieve excess pressure should such occur in the circuit. When pump 60 is driven by an electric motor with constant speed to discharge pressure fluid of a constant rate, flow control valve 61 is unnecessary.

A flow dividing valve 65 is connected to an outlet port of flow control valve 61 by way of a conduit 66. Flow dividing valve 65 includes valve casing 37 provided with first and second outlet ports 38, 39. A spool valve 67 is positioned in valve casing 37 and is movable so as to vary the opening areas of first and second outlet ports 38, 39 with respective land portions formed thereon in an inverse manner with respect to each other. Flow dividing valve 65 includes first and second flow paths 92, 93 which respectively connect conduit 66 to first and second outlet ports 38, 39 through the interior of valve casing 37. A metering orifice 68 is located in second flow path 93 while a spring 69 is accommodated in a rear chamber 99 of valve casing 37 and urges spool valve 67 in a direction to open second outlet port 39 and inversely to close first outlet port 38. First flow path 92 communicates with a front chamber 96 of valve casing 37 while orifice 68 communicates with rear chamber 99. Thus, valve spool 67 is urged against spring 69 by the pressure difference across orifice 68 to divide pressure fluid Q into first and second fluid flow QG, QR discharged from first and second outlet ports 38, 39. First and second outlet ports 38, 39 are respectively connected to servo-valve 30 and reaction chambers 56 by way of conduits 45, 46. A conduit 90 provided with an orifice 91 is connected between conduits 45, 46. A magnetic control valve 70 is connected to reaction chambers 56 so as to control fluid pressure PR applied to reaction chamber 56 in accordance with a vehicle operating condition such as vehicle speed.

Referring now to FIG. 5, magnetic control valve 70 is provided with a valve body 100 which is made of magnetic material and is threaded in a housing 111. In housing 111 there are formed a conduit 151 which communicates with conduit 46 connected to reaction chamber 56, and a conduit 152 which communicates with a reservoir. A valve sleeve 113 provided with inlet and outlet ports 114, 115 which respectively open into conduit 151, 152 is bodily attached to valve body 117 by brazing.

A cylindrical spool valve 117 of magnetic material is axially slidably disposed in a bore 113a formed in valve sleeve 113. A tubular plug 116 is fixed by force fitting to outlet port 115 of valve sleeve 113 to define a stroke end of spool valve 117. In spool valve 117 there is formed an axial through hole 118 which opens into outlet port 115. A slit 122 which opens into through hole 118 is radially formed on the end portion of spool valve 117. Slit 122 is closed by an edge of first port 114 when spool valve 117 is located between an end position where spool valve 117 abuts on tubular plug 116 and a first position at a very little distance from the end position. Slit 122 faces inlet port 114 to define a variable orifice in combination with inlet port 114 when spool valve 117 is in a normal operating range of positions between the first position and a second position. An orifice hole 120 which connects inlet port 114 with through hole 118 when spool valve 117 is located between the end position and the second position is radially formed on spool valve 117. On spool valve 117 there is radially formed a extra orifice 121 which connects inlet port 114 with through hole 118 when the spool valve 117 is located between the end position and the first position, but is closed by the edge of inlet port 114 when spool valve 117 is located between the first and second positions.

A tubular sleeve 136 is fixed to a projecting portion of valve body 100 by, for instance, brazing. A yoke 137 of magnetic material and a ring 150 of nonmagnetic material disposed between the projecting portion of valve body 100 and yoke 137 are fixed to the inside of tubular sleeve 136 by force fitting. A solenoid 139 which is wound around a bobbin 138 of nonmagnetic material is attached to the periphery of sleeve 136. A cover 135 of magnetic material which covers solenoid 139 and abuts valve body 100 is fixed to the top end of yoke 137. A spring 125 made of stainless steel is disposed between a screw 140 threaded in yoke 137 and spool valve 117 so as to urge spool valve 117 toward tubular plug 116. Solenoid 139 is connected to a solenoid drive circuit 141 which in turn is controlled by a computer 142. Accordingly, solenoid drive circuit 141 generates current (i) in accordance with a signal proportional to vehicle speed V generated from a conventional speedometer 143. Control current (i) may be modulatd with another vehicle operating condition such as load weight.

Operation of the power steering system as described above will now be explained. Fluid flow QO discharged from pump 60 is divided into fluid flow Q of a constant rate and excess flow by flow control valve 61. Fluid flow Q is in turn divided into first fluid flow QG led to supply port 35 of servo-valve 30 and second fluid flow QR led to reaction device 49 by flow dividing valve 65.

Figure 7:
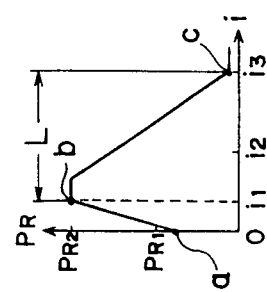
FIG. 7 is a graph showing fluid pressure controlled by the magnetic control valve as a function of current applied thereto.
Figure 8:
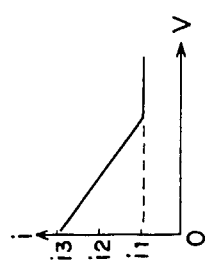
FIG. 8 is a graph showing current applied to the magnetic control valve as a function of vehicle speed.

As shown in FIG. 8, the current (i) which is supplied to solenoid 139 of magnetic control valve 70 is at a maximum (i3) when the vehicle speed V is low or zero, then is decreased as the vehicle speed increases, and becomes minimum (i1) when the vehicle speed exceeds a predetermined speed. When the maximum current (i3) is supplied to solenoid 139, spool valve 117 is largely extracted by solenoid 139 against the resilient force of spring 125 to the second position as shown in FIG. 6(c) where orifice hole 120 and slit 122 open into inlet port 114 to a maximum degree but extra orifice 121 is closed by the edge of inlet port 114. Accordingly, as second fluid flow QR is drained to the reservoir without substantial restriction, reaction fluid pressure PR is hardly generated in reaction chamber 56 as shown in FIG. 7. Thus, when input shaft 23 is turned according to manual maneuvering of the steering wheel, plungers 54 are easily retracted, resulting in easy relative rotation between sleeve valve member 32 and rotary valve member 31 in normal power assisted steering operation so as to increase the fluid pressure PG supplied to fluid motor 16.

As current (i) supplied to solenoid 139 decreases in accordance with the increase in vehicle speed, spool valve 117 is proportionately moved downward by spring 125 so as to close slit 122. Finally, when the minimum current (i1) is supplied to solenoid 139, spool valve 117 is balanced at the first position as shown in FIG. 6(b) where orifice hole 120 opens into inlet port 114 but slit 122 and extra orifice 121 are closed by the edge of inlet port 114. Therefore, second fluid flow QR is throttled so as to increase reaction fluid pressure PR as shown in FIG. 7, and, accordingly, plungers 54 offer resistance to the rotation of projections 50. Such resistance increases the manual torque which is necessary to generate relative rotation between sleeve valve member 32 and rotary valve member 31 and, as a result, produces less power assistance at high vehicle speeds than at low vehicle speeds. Moreover, restricted fluid flow by orifice 91 is led to conduit 46 through conduit 90 when the fluid pressure PG supplied to fluid motor 16 increases in accordance with manual maneuvering of the steering wheel. Accordingly, when spool valve 117 is moved downward to close slit 122, the fluid flow through conduit 90 into conduit 46 causes an additional pressure increase in reaction fluid pressure PR so as to communicate to a driver a feeling of more definite resistance in turning the steering wheel at high vehicle speeds.

In the event where the current (i) supplied to solenoid 139 becomes null because of the occurrence of problem such as breaking of the wire, spool valve 117 is urged to the end position by spring 125 to abut on tubular plug 116 as shown in FIG. 6(a). When spool valve 117 is at the end position, orifice hole 120 and extra orifice 121 opens into inlet port 114 without the opening of slit 122 into inlet port 114, so as to maintain reaction fluid pressure PR at an approximately middle pressure between minimum and maximum pressures which are respectively generated when spool valve 117 is located at second and first positions. Accordingly, even when current (i) supplied to solenoid 139 becomes null because of the occurrence of a problem, it is not difficult to maneuver the steering wheel at low vehicle speeds or when the vehicle is stopped, and excess power assistance at high vehicle speeds is also avoidable.

Figure 9:
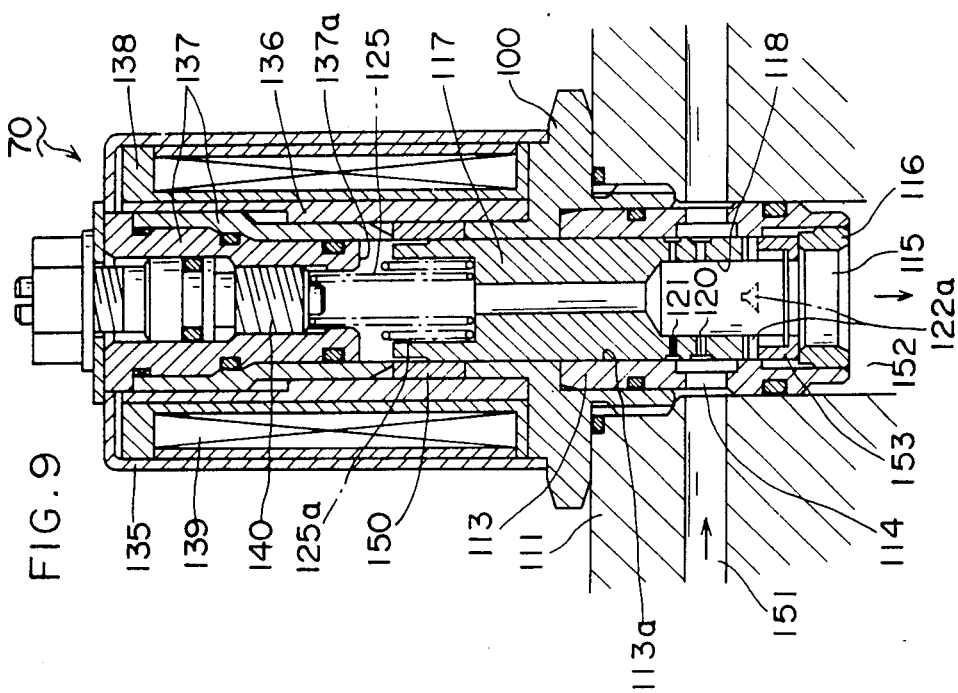
FIG. 9 is a longitudinal sectional view of a second embodiment of the magnetic control valve.

Another example of magnetic control valve 70 is shown in FIG. 9, wherein excess power assistance at high vehicle speeds is avoidable when current exceeding the maximum current (i3) is supplied to solenoid 39 in addition to maintaining reaction fluid pressure PR at approximately a middle pressure valve of the normal operating range of pressures when current (i) supplied to solenoid 139 becomes null.

The following elements are added to magnetic control valve 70 shown in FIG. 5 to avoid excess power assistance at high vehicle speeds. A spring 125a having a larger coil diameter than the diameter of spring 125 is disposed as a buffer between an end face 137a of the small diameter portion of yoke 137 and spool valve 117 surrounding spring 125. The length of spring 125a is arranged such that spring 125a abuts on an end face 137a when spool valve 117 is located at the second position. Therefore, spring 125a is compressed so as to absorb the shock of abutment of spool valve 117 on end face 137a when spool valve 117 is overshifted to the overrun position due to the excess supply of current exceeding maximum current (i3) to solenoid 139. Further, an end plate 153 is fixed to the bottom end of spool valve 117 so as to form a slot 122a enclosed with a surrounding edge by closing the open end of slit 122.

Figure 11:
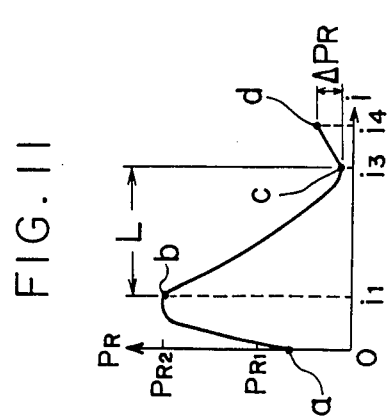
FIG. 11 is a graph showing fluid pressure controlled by the magnetic control valve shown in FIG. 9 as a function of current applied thereto.

Operation of magnetic control valve 70 shown in FIG. 9 is the same as that for the operation of magnetic control valve 70 shown in FIG. 5 in the normal operating condition and in the event where current (i) supplied to solenoid 139 becomes null. That is, when the maximum current (i3) is supplied to solenoid 139 at low vehicle speeds or when the vehicle is stopped, spool valve 117 is shifted to the second position as shown in FIG. 10(c) where orifice hole 120 and slot 122a open into inlet port 114 to a maximum degree but extra orifice 121 is closed by the edge of inlet port 114, so as to generate minimum reaction fluid pressure (c) as shown in FIG. 11. While spool valve 117 is at the second position, spring 125a abuts an end face 137a of yoke 137, but a space (l) is formed between the end face of spool valve 117 and end face 137a of yoke 137. When the minimum current (i1) is supplied to solenoid 139 at high vehicle speeds, spool valve 117 is balanced at the first position as shown in FIG. 10(b) where orifice hole 120 opens into inlet port 114 but slot 122a and extra orifice 121 are closed by the edge of inlet port 114, so as to generate maximum reaction fluid pressure (b). In the event where the current (i) supplied to solenoid 139 becomes null, spool valve 117 is urged to the end position as shown in FIG. 10(a) in which orifice hole 120 and extra orifice 121 opens into inlet port 114 but slot 122a is closed by the edge of inlet port 114, so as to generate a middle valve reaction fluid pressure (a) as shown in FIG. 11.

In the event where current (i4) exceeding the maximum current (i3) is supplied to solenoid 139 due to, for instance, problems with the controller, spool valve 117 is shifted to the overrun position as shown in FIG. 10(d) against the resilient forces of spring 125, 125a, so as to abut on end face 137a of yoke 137. When spool valve 117 is at the overrun position, extra orifice 121 is closed by the edge of inlet port 114, orifice hole 120 is narrowed or closed by the edge of inlet port 114, and slot 122a opens into inlet port 114. Accordingly, second fluid flow QR is throttled by slot 122a and narrowed orifice hole 120, so as to increase reaction fluid pressure PR by the amount of OPR from minimum reaction fluid pressure (c) as shown in FIG. 11. Therefore, excess power assistance and accordingly, the loss of stabilization of the steering wheel at high vehicle speeds is avoidable when solenoid 139 is overexcited in a failure mode.

Figure 12:
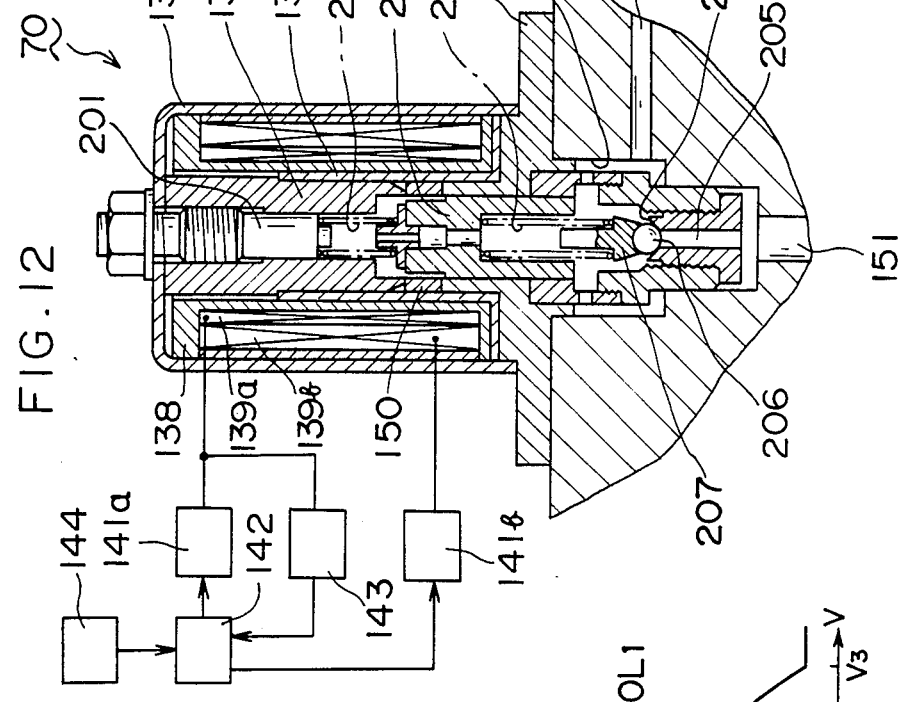
FIG. 12 is a longitudinal sectional view of a third embodiment of the magnetic control valve.

There is shown in FIG. 12 a magnetic pressure control valvue which can be substituted for magnetic control valve 70 shown in FIG. 5. A valve body 100 is in threaded engagement with a housing 111. A conduit 151 which communicates with reaction chamber 56 and a conduit 152 which communicates with a reservoir are formed in housing 111. A tubular sleeve 136 is fixed to a projecting portion of valve body 100. A ring 150 of nonmagnetic material and a yoke 137 of magnetic material are fixed to the inside of tubular sleeve 136 by force fitting. A first solenoid 139a and a second solenoid 139b which are wound around a bobbin 138 of magnetic material are attached to the periphery of sleeve 136. A cover 135 of magnetic material is fixed to the top end of yoke 137 to cover first and second solenoid 139a, 139b.

A valve seat member 204 which has a relief passage 205, communicating with conduit 151 is fixed to valve body 100. A plunger 200 is slidably mounted in valve body 100. A first spring 202 is disposed between a screw 201 threaded in yoke 137 and plunger 200 so as to urge plunger 200 toward valve seat member 204. A ball valve 20b is placed between valve seat member 204 and a pusher 207 to close relief passage 205 and is urged to abut valve seat member 204 by a second spring 203 which is disposed between pusher 207 and plunger 200.

First and second solenoid 139a, 139b are respectively connected to first and second solenoid drive circuit 141a, 141b which in turn are controlled by a computer 142. An ammeter 143 is connected to first solenoid 139a to detect current supplied thereto and the output of ammeter 143 is conveyed to computer 142. A conventional speedometer 144 which generates a signal proportional to vehicle speed V is also connected to computer 142.

Figure 14:
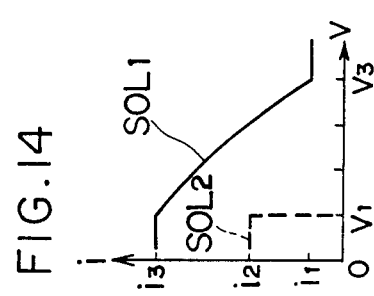
FIG. 14 is a graph showing current applied to the magnetic control valve shown in FIG. 12 as a function of vehicle speed.

Operation of magnetic pressure control valve 70 will now be explained. In a normal operating condition, computer 142 sends a signal in response to vehicle speed V to first solevoid drive circuit 141a so as to allow first solenoid drive circuit 141a generate current (i) which decreases as vehicle speed V increases, as shown in FIG. 14. Current (i) is supplied to first solenoid 139a so as to retract plunger 200 to a position where the attractive force of first solenoid 139a balances with the resilient force of first spring 202. Accordingly, the resilient force of second spring 203 for urging ball valve 206 onto valve seat member 204 is decreased and, as a result, the threshold value of pressure of magnetic pressure control valve 70 is decreased.

Figure 13:
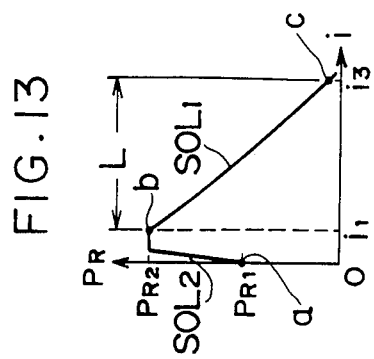
FIG. 13 is a graph showing fluid pressure controlled by the magnetic control valve shown in FIG. 12 as a function of current applied thereto.

At low vehicle speeds or when the vehicle is stopped, maximum current (i3) is supplied to first solenoid 139a so as to shift plunger 200 by a maximum distance. Therefore, the resilient force of second spring 203 becomes almost null and, accordingly, the threshold value of pressure of magnetic pressure control valve 70 becomes minimum. Thus generating minimum reaction fluid pressure (c) as shown in FIG. 13, which, in turn, allows for the generation of sufficient power assistance. At high vehicle speeds, as minimum current (i1) is supplied to first solenoid 139a, plunger 200 is hardly retracted. Therefore, the resilient force of second spring 203 is kept strong so as to maximize the threshold valve of pressure of magnetic pressure control valve 70. Thus, maximum reaction fluid pressure (b) is generated as shown in FIG. 13, resulting in less power assistance.

In the event where current (i) supplied to solenoid 139a becomes null due to, for instance, problems in second solenoid drive circuit 141a, such is detected by ammeter 143. Computer 142 checks the output of ammeter 143 periodically, and as soon as it recognizes that current is not being supplied, renders first solenoid drive circuit 141a inoperative and make second solenoid drive circuit 141b operative to supply current (i2) which is midway between maximum and minimum currents (i3), (i1) to second solenoid 139b as shown in FIG. 14. Plunger 200 is shift corresponding to current (i2) so as to generate the resilient force of second spring 203, and accordingly, the threshold valve of pressure of magnetic pressure control valve 70 is approximately midway between maximum and minimum.

Therefore, even when current (i) supplied to first solenoid 139a becomes null due to some problem occurring, an approximately middle valve reaction fluid pressure (a) between minimum and maximum reaction fluid pressures (c), (b) is generated, and thus an extremely heavy effort is not necessary in turning the steering wheel at low vehicle speeds or when the vehicle is stopped, and excessive power assistance at high vehicle speeds is also avoidable.

Although in the above-described embodiments, reaction device 49 is constructed such that a pair of radial projections 50 are formed on input shaft 23, and two pairs of plungers are slidably received in output shaft 21 and are urged toward the respective sides of projections 50 by the fluid pressure so as to provide resistance against relative rotation between input and output shafts 23, 21, the same effect as in the above-described embodiments can be obtained in the case where plungers are radially slidably received in output shaft 21 and are urged by the fluid pressure toward V-shaped grooves which are axially made on the periphery of input shaft 23, or in another case where plungers are axially slidably recieved in output shaft 21 and are urged by the fluid pressure toward V-shaped grooves which are radially made on a flange portion of input shaft 23.

Obviously, numerous modifications and variations of the present invention are possible in light of the above teachings, it is therefore to be understood that within the scope of the appended claims, the invention may be practiced otherwise than as specifically described herein.

What is claimed as new and desired to be secured by Letters Patent of the United States is:

1. A power steering system which utilizes fluid source means for supplying pressure fluid of a constant flow rate and fluid motor means for supplementing manual steering torque, comprising:
    a valve housing;
    a rotatable output shaft partially positioned within said valve housing and operatively connected with said fluid motor;
    a rotatable input shaft partially positioned within said valve housing, aligned with said output shaft and adapted for manual actuation;
    servo-valve means located in said valve housing for distributing fluid flow to said fluid motor in accordance with relative rotation between said input and output shaft;
    reaction means located in said valve housing for providing resistance against relative rotation between said input and output shaft in accordance with fluid pressure supplied thereto;
    magnetic control valve means having a solenoid and connected to said reaction means for varying fluid pressure applied thereto in a predetermined range of pressure according to excitation of said solenoid in accordance with a vehicle operating condition; and
    means incorporated in said magnetic control valve means for controlling said fluid pressure at a predetermined pressure in said predetermined range when the current supplied to said solenoid becomes abnormal.

2. A power steering system as set forth in claim 1, wherein said means incorporated in said magnetic control valve comprises means for controlling said fluid pressure at said predetermined pressure in said predetermiend range when the current supplied to said solenoid becomes null.

3. A power steering system as set forth in claim 2, wherein said predetermined pressure is of approximately a middle valve of said predetermined range.

4. A power steering system as set forth in claim 1, wherein said means incorporated in said magnetic control valve means comprises means for controlling said fluid pressure at said predetermined pressure in said predetermined range when the current supplied to said solenoid exceeds a maximum current of a normal range of values.

5. A power steering system which utilizes fluid source means for supplying pressure fluid of a constant flow rate and fluid motor means for supplementing manual steering torque, comprising:
    a valve housing;
    a rotatable output shaft partially positioned within said valve housing and operatively connected with said fluid motor;
    a rotatable input shaft partially positioned within said valve housing, aligned with said output shaft and adapted for manual actuation;
    servo-valve means located in said valve housing for distributing fluid flow to said fluid motor in accordance with relative rotation between said input and output shaft;
    reaction means located in said valve housing for providing resistance against relative rotation between said input and output shaft in accordance with fluid pressure supplied thereto;
    magnetic control valve means provided with a solenoid therein, connected to said reaction means for varying fluid pressure applied thereto in a predetermined range of pressure according to excitation of said solenoid in accordance with vehicle operating condition;
    means incorporated in said magnetic control valve means for controlling said fluid pressure at a first predetermined pressure in said predetermined range when the current supplied to said solenoid becomes null, and at a second predetermined pressure in said predetermined range when the current supplied to said solenoid exceeds the maximum current of a normal range.

6. A power steering system which utilizes fluid motor means for supplementing manual steering torque, comprising:
    a valve housing;
    a rotatable output shaft partially positioned within said valve housing and operatively connected with said fluid motor;
    a rotatable input shaft partially positioned within said valve housing, aligned with said output shaft and adapted for manual actuation;
    servo-valve means located in said valve housing for distributing fluid flow to said fluid motor in accordance with relative rotation between said input and output shaft;
    reaction means located in said valve housing for providing resistance against relative rotation between said input and output shaft in accordance with fluid pressure supplied thereto;
    fluid flow supply means for supplying first fluid flow directed to said servo-valve means and second fluid flow directed to said reaction means; and
    a magnetic control valve including a valve body having a bore, a first port connected to a first one of said reaction means and a reservoir and a second port connected to a second one of said reaction means; a spool valve axially slidably disposed in said bore and having an axial hole opening into said second port; spring means for urging said spool valve to an end position; solenoid means mounted on said valve body for moving said spool valve according to excitation thereof against a resilient force of said spring means between first and second positions in accordance with vehicle operating condition; and radial path means formed on said spool valve opening into said axial hole to define in combination with said first port a variable orifice having an opening area which varys from minimum to maximum as said spool valve is moved from said first position to said second position, wherein the opening area comprises a predetermined area between said minimum and maximum when said spool valve is urged to said end position beyond said first position by said spring means when said excitation of said solenoid is discontinued.

7. A power steering system as set forth in claim 6, wherein said predetermined area is of an approximately middle valve between said minimum and maximum valve.

8. A power steering system as set forth in claim 6, wherein said radial path means comprises a slit which defines a combination with said first port a variable orifice whose area increases as said spool valve is moved from said end position to said second position, and an extra orifice which faces said first port only when said spool valve is at said end position.

9. A power steering system as set forth in claim 8, wherein said radial path means comprises an orifice which faces said first port when said spool valve is located betwen said end position and said second position.

10. A power steering system which utilizes fluid source means for supplying pressure fluid of a constant flow rate and fluid motor means for supplementing manual steering torque, comprising:
a valve housing;
a rotatable output shaft partially positioned within said valve housing and operatively connected with said fluid motor;
a rotatable input shaft partially positioned within said valve housing, aligned with said output shaft and adapted for manual actuation;
servo-valve means located in said valve housing for distributing fluid flow to said fluid motor in accordance with relative rotation between said input and output shaft;
reaction means located in said valve housing for providing resistance against relative rotation between said input and output shaft in accordance with fluid pressure supplied thereto;
flow dividing valve means for dividing said pressure fluid from said fluid source means in a predetermined ratio into a first fluid flow directed to said servo-valve means and a second fluid flow directed to said reaction means; and
a magnetic control valve including a valve body having a bore, a first port connected to a first one of said reaction-means and a reservoir and a second port connected to a second one of said reaction means; a spool valve axially slidably disposed in said bore and having an axial hole opening into said second port; spring means for urging said spool valve to an end position; solenoid means mounted on said valve body for moving said spool valve according to excitation thereof against a resilient force of said spring means between first and second positions in accordance with vehicle operating condition; and radial path means formed on said spool valve opening into said axial hole to define in combination with said first port a variable orifice whose area varys from minimum to maximum as said spool valve is moved from said first position to said second position, wherein the area comprises a predetermined area between said minimum and maximum when said spool valve is urged to said end position beyond said first position by said spring means when said excitation of said solenoid is discontinued.

11. A power steering system which utilizes fluid motor means for supplementing manual steering torque, comprising:
a valve housing;
a rotatable output shaft partially positioned within said valve housing and operatively connected with said fluid motor;
a rotatable input shaft partially positioned within said valve housing, aligned with said output shaft and adapted for manual actuation;
servo-valve means located in said valve housing for distributing fluid flow to said fluid motor in accordance with relative rotation between said input and output shaft;
reaction means located in said valve housing for providing resistance against relative rotation between said input and output shaft in accordance with fluid pressure supplied thereto;
fluid flow supply means for supplying a first fluid flow directed to said servo-valve means and a second fluid flow directed to said reaction means; and
a magnetic control valve including a valve body having a bore, a first port connected to a first one of said reaction means and a reservoir and a second port connected to a second one of said reaction means;
a spool valve axially slidably disposed in said bore and having an axial hole opening into said second port; spring means for axially urging said spool valve; solenoid means mounted on said valve body for moving said spool valve according to excitation thereof against a resilient force of said spring means between first and second positions in accordance with vehicle operating conditions; and radial path means formed on said spool valve opening into said axial hole to define in combination with said first port a variable orifice whose area varies from minimum to maximum as said spool valve is moved from said first position to said second position, wherein said area comprises a predetermined area between said minimum and maximum when said spool valve is attracted to an overrun position beyond said second position due to overexcitation of said solenoid.

12. A power steering system as set forth in claim 11, wherein said radial path means comprises a slot which defines in combination with said first port a variable orifice whose area increases as said spool valve is moved from said first position to said second position, and an orifice which faces said first port when said spool valve is located between said first and second position, and which is closed by an edge portion of said first port when said spool valve is at said overrun position.

13. A power steering system which utilizes fluid source means for supplying pressure fluid of a constant flow rate and fluid motor means for supplementing manual steering torque, comprising:
a valve housing;
a rotatable output shaft partially positioned within said valve housing and oepratively connected with said fluid motor;

a rotatable input shaft partially positioned within said valve housing, aligned with said output shaft and adapted for manual actuation;

servo-valve means located in said valve housing for distributing fluid flow to said fluid motor in accordance with relative rotation between said input and output shaft;

reaction means located in said valve housing for providing resistance against relative rotation between said input and output shaft in accordance with fluid pressure supplied thereto;

flow dividing valve means for dividing said pressure fluid from said fluid source means under a predetermined ratio into a first fluid flow directed to said servo-valve means and a second fluid flow directed to said reaction means; and a magnetic control valve including a valve body having a bore, a first port connected to a first one of said reaction means and a reservoir and a second port connected to a second one of said reaction means; a spool valve axially slidably disposed in said bore and having an axial hole opening into said second port; spring means for axially urging said spool valve; solenoid means mounted on said valve body for moving said spool valve according to excitation thereof against a resilient force of said spring means between first and second positions in accordance with vehicle operating conditions; and radial path means formed on said spool valve opening into said axial hole to define in combination with said first port a variable orifice whose area varies from minimum to maximum as said spool valve is moved from said first position to said second position, wherein said area comprises a predetermined area between said minimum and maximum when said spool valve is attracted to an overrun position beyond said second position due to overexcitation of said solenoid.

14. A power steering system which utilizes fluid motor means for supplementing manual steering torque, comprising:

a valve housing;

a rotatable output shaft partially positioned within said valve housing and operatively connected with said fluid motor;

a rotatable input shaft partially positioned within said valve housing, aligned with said output shaft and adapted for manual actuation;

servo-valve means located in said valve housing for distributing fluid flow to said fluid motor in accordance with relative rotation between said input and output shaft;

reaction means located in said valve housing for providing resistance against relative rotation between said input and output shaft in accordance with fluid pressure supplied thereto;

fluid flow supply means for supplying first fluid flow directed to said servo-valve means and second fluid flow directed to said reaction means; and a magnetic control valve including a valve body having a bore, a first port connected to a first one of said reaction means and a reservoir and a second port connected to a second one of said reaction means; a spool valve axially slidably disposed in said bore and having an axial hole opening into said second port; spring means for urging said spool valve to an end position; solenoid means mounted on said valve body for moving said spool valve according to excitation thereof against a resilient force of said spring means between first and second positions in accordance with vehicle operating condition; and radial path means formed on said spool valve opening into said axial hole to define in combination with said first port a variable orifice whose area varies from minimum to maximum as said spool valve is moved from said first position to said second position, wherein said area comprises a first predetermined area between said minimum and maximum when said spool valve is urged to said end position beyond said first position by said spring means when said excitation of said solenoid is discontinued, and further comprises a second predetermined area between said minimum and maximum when said spool valve is attracted to an overrun position beyond said second position due to overexcitation of said solenoid.

15. A power steering system which utilizes fluid source means for supplying pressure fluid of a constant flow rate and fluid motor means for supplementing manual steering torque, comprising:

a valve housing;

a rotatable output shaft partially positioned within said valve housing and operatively connected with said fluid motor;

a rotatable input shaft partially positioned within said valve housing, aligned with said output shaft and adapted for manual actuation;

servo-valve means located in said valve housing for distributing fluid flow to said fluid motor in accordance with relative rotation between said input and output shaft;

reaction means located in said valve housing for providing resistance against relative rotation between said input and output shaft in accordance with fluid pressure supplied thereto;

magnetic pressure control valve means provided with first and second solenoids and connected to said reaction means for varying fluid pressure applied thereto, said first solenoid being adapted to vary relief pressure of said magnetic pressure control valve means in a predetermined range of pressures in accordance with vehicle operating and conditions, and said second solenoid being adapted to hold said relief pressure at a predetermined pressure in said predetermined range when excitation of said first solenoid is discontinued.

* * * * *